United States Patent [19]
Etzel et al.

[11] Patent Number: 5,591,346
[45] Date of Patent: Jan. 7, 1997

[54] WATER TREATMENT PROCESS

[75] Inventors: James E. Etzel, Lafayette; Joseph Kurek, Franklin, both of Ind.

[73] Assignee: Heritage Environmental Services, Inc., Indianapolis, Ind.

[21] Appl. No.: 476,731

[22] Filed: Jun. 7, 1995

Related U.S. Application Data

[62] Division of Ser. No. 181,844, Jan. 14, 1994, Pat. No. 5,453,201.

[51] Int. Cl.$^6$ .................................................. C02F 9/00
[52] U.S. Cl. ........................ 210/668; 210/669; 210/683; 210/911
[58] Field of Search ................................ 210/668, 669, 210/679, 683, 684, 911

[56] References Cited

U.S. PATENT DOCUMENTS

| | | | |
|---|---|---|---|
| 3,984,313 | 10/1976 | Higgins | 210/26 |
| 4,741,886 | 5/1988 | Vanderpool et al. | 210/729 |
| 4,915,928 | 4/1990 | Marcantonio | 423/510 |
| 5,024,769 | 6/1991 | Gallup | 210/911 |
| 5,137,640 | 8/1992 | Poncha | 210/911 |
| 5,369,072 | 11/1994 | Benjamin et al. | 502/84 |
| 5,419,816 | 5/1995 | Sampson et al. | 204/59 R |

OTHER PUBLICATIONS

"Selenium Oxidation and Removal by Ion Exchange", Boegel, et al., Dept. Civil Engineering, Houston University, Houston, Texas USA, 1986, No. EPA/600/2-86/031.

"Selective Collection of Selenium (IV) From Environmental Water by Functionalized Ion–Exchange Resin", Tanaka, et al., *Stud Environ. Sci.*, vol. 23, pp. 365–372.

"In Situ Reduction of Ion Exchange Resins As A Method For Preconcentration of Selenium And Other Heavy Metals From Aqueous Solutions", Bernier, et al., *Trace Subs. Environ. Health*, vol. 10, 1976, pp. 323–331.

"Communication: A Water Treatment Process For Selenium Removal", A.P. Murphy, *Journal WPCF*, vol. 61, No. 3, pp. 361–362.

"Characterization, Development And Use of New Breed On Anion–Exchange Resins For Selective Removal of Cr(VI) And Other Toxic Agents", Sengupta, et al., Resin Technology, 42nd PIWC, 1987.

*Primary Examiner*—Ivars Cintins
*Attorney, Agent, or Firm*—Barnes & Thornburg

[57] ABSTRACT

A water or wastewater purification process is described for reducing selenium and arsenic concentrations in contaminated water or wastewater streams. Iron loaded cation exchange resins, when contacted with contaminated water or wastewater streams are effective to form immobilized complexes with selenite and arsenate contaminants. The iron loaded resins can be easily regenerated by sequential treatment with acid and a solution of a soluble iron salt.

4 Claims, 2 Drawing Sheets

WATER TREATMENT PROCESS

This is a division of application Ser. No. 08/181,844 filed Jan. 14, 1994, now U.S. Pat. No. 5,453,201.

BACKGROUND AND SUMMARY

The present invention relates to processes for reducing the concentration of selenium and/or arsenic in wastewater or drinking water. More particularly, the present invention is directed to water purification processes using an iron-loaded cation exchange resin to separate selenium and arsenic contaminants in the form of cation exchange resin immobilized iron(III) selenite and iron(III) arsenate complexes.

Selenium is a Group 6A nonmetal found in nature in the −2, 0, +4, and +6 oxidation states. Selenite (Se(IV)) and selenate (Se(VI)) are the most common forms occurring in groundwater. Although selenium is believed to be an essential trace element, it is highly toxic to humans and livestock in large doses. Accordingly the EPA has established a low maximum contaminant level for selenium in drinking water (10 micrograms/liter as of 1989), creating the need for the development of effective selenium removal technologies.

In addition to natural selenium contamination of groundwater and surface water, potential selenium pollution from industrial sources is significant. Selenium finds use in the manufacture of a wide variety of industrial products including pigments, glass, rubber, insecticides, and electronic components. Selenium is frequently present in wastewater streams from petroleum refineries, coal-fired power plants, and mining operations. Clean up of wastewater streams from such sources presents substantial technical challenges.

Numerous water treatment methods have been employed to achieve acceptable removal of selenium from wastewaters. Lime softening, conventional coagulation, activated carbon, and activated alumina adsorption methods have all been attempted, with mixed results.

Ion exchange has also been studied. Removal of selenium using a strong-base anion exchange resin, for example, is described in U.S. Pat. No. 4,915,928 to Marcantonio. Tanaka et al., Selective Collection of Selenium (IV) From Environmental Water By Functionalized Ion Exchange Resin, describes the use of an anion exchange resin in connection with bismuthiol-II and azothiopyrinsulfonic acid (ATPS) as terfunctional reagents. Boegel et al., EPA Report No. 600/2-86/031 (1986), recommends a two-step process of oxidation of selenium-containing water with free chlorine followed by strong-base anion exchange. Some anion exchange techniques have been unsuccessful due to their inability to handle sulfur-laden wastewater streams. Selenium and sulfur have very similar chemical properties, including similar affinity for anion exchange resins. Thus, sulfur may occupy a majority of the resin binding sites to the exclusion of selenium, rendering the anion exchange resin ineffective.

Arsenic is a 5A nonmetal found in nature in the −3, 0, +3, and +5 oxidation states. Arsenite (III) and arsenate (V) are the most common forms found in drinking water and wastewater streams. Thus, as in the case of selenium contaminants, health and environmental concerns regarding arsenic contaminants in wastewater and drinking water streams have stimulated significant research and development of efforts to define water purification techniques for arsenic removal. There exists a need for new water purification technologies that can provide cost effective commercially practicable removal of selenium and arsenic from contaminated water streams.

In accordance with one embodiment of the present embodiment there is provided a process for treating a wastewater or drinking water stream contaminated with selenium to reduce the concentration of selenium contaminants. When the selenium contaminant is primarily in the form of selenite, the process comprises contacting the stream with a cation exchange resin, preferably a strong acid cation exchange resin, loaded (complexed) with iron(III). The selenite anions react with the resin complexed iron cations to form iron(III) selenite complexes immobilized on the resin surface. To optimize selenium removal as selenite, it is preferred that the process include the step of treating the water or wastewater stream with a reducing agent to convert a major portion of the non-selenite forms of selenium contaminants to selenite before contact with the iron(III)-complexed cation exchange resin. Thus when a selenite stream is, for example, passed through a bed of an iron(III)-complexed strong cation exchange resin, iron-selenite forms as an immobilized ionic complex on the surface of the cation exchange resin resulting in a treated effluent stream having a reduced selenium concentration. The iron complexed cation exchange resin can be readily regenerated for use in accordance with the invention by contacting it firstly with an acid (to release the iron selenite complex and form the acid form of the resin) and thereafter with a solution of a water soluble iron salt.

In accordance with another aspect of the present invention, a method is provided for reducing arsenic concentration in a wastewater or drinking water by contacting the stream with an iron(III)-complexed cation exchange resin, preferably a strong acid cation exchange resin, to form an iron(III) arsenate complex immobilized on the cation exchange resin and an effluent stream having reduced arsenic concentration. Preferably the arsenic contaminated water or wastewater stream is treated with an oxidant to convert a major portion of the arsenite forms of arsenic to arsenate prior to contacting the stream with the iron(III)-complexed cation exchange resin.

The present invention provides an efficient and easily managed process for removing selenium and arsenic components from water or wastewater streams by taking advantage of the formation and immobilization of ionic complexes of iron(III) selenite and arsenate on the complexed-iron bearing surfaces of the cation exchange resin. Thus in accordance with the present invention ionic complexes are formed by reaction of the respective contaminant anions with the exchange resin complexed cationic iron, and are thereby immobilized on the surface of the cation exchange resin. The iron-complexed cation exchange resin can be easily regenerated in a resin bed or resin column configuration by consecutive treatment with acid and a solution of a soluble iron salt.

There is also provided in accordance with this invention a water treatment apparatus for reducing the concentration of selenium and arsenic in contaminated water streams. The apparatus comprises a strong acid cationic exchange resin complexed with iron(III), means for contacting the contaminated water stream with the ion exchange resin, and, optionally, means for pretreating (reducing or oxidizing respectively) the contaminated water stream before contact with the iron-complexed resin.

Additional objects, features and advantages of the invention will become apparent to those skilled in the art upon consideration of the following detailed description of the preferred embodiments exemplifying the best mode of carrying out the invention as presently perceived.

DETAILED DESCRIPTION OF THE INVENTION

Figure 1:
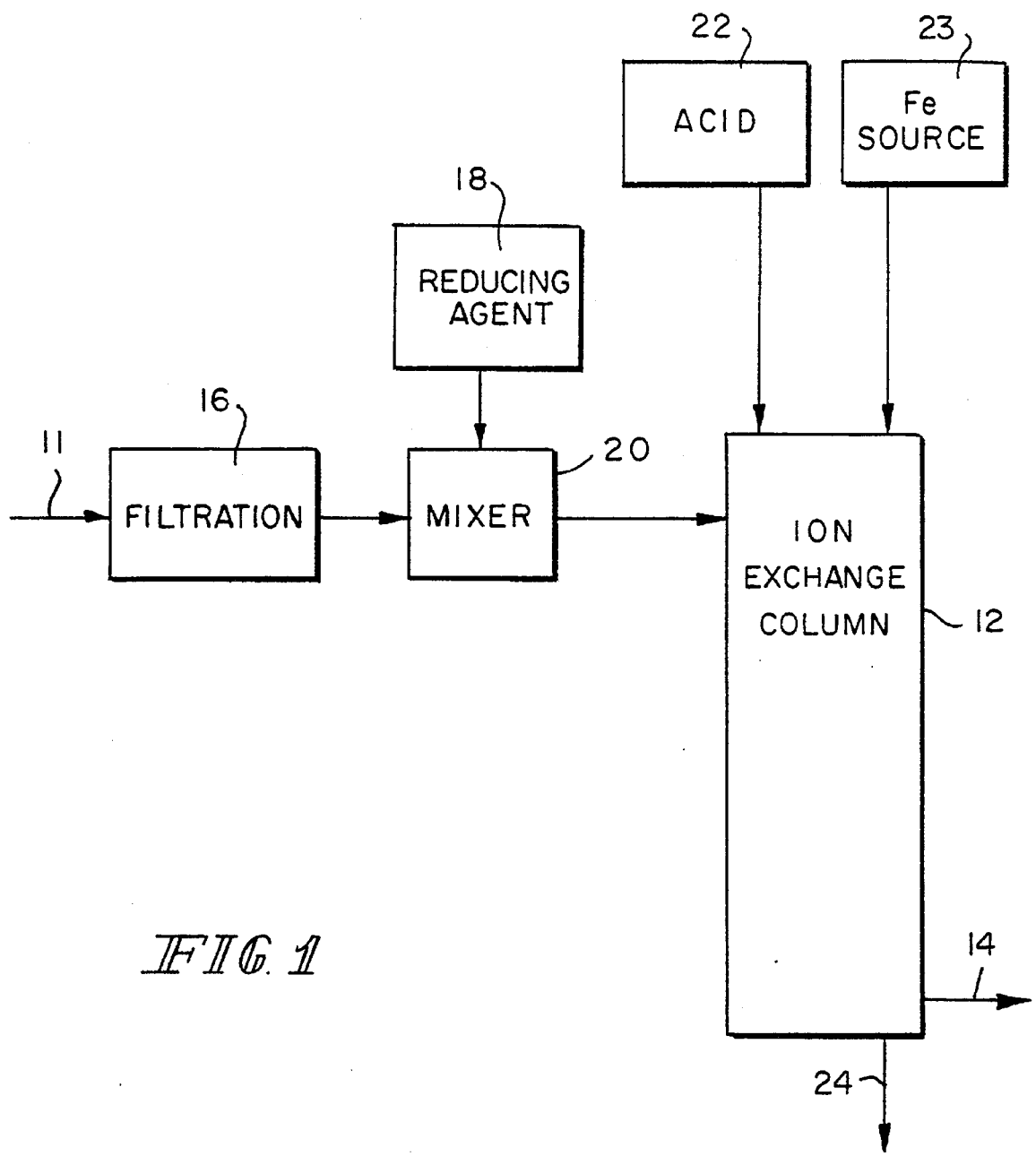
FIG. 1 is a flow sheet for a preferred embodiment of the process of the present invention for reducing the concentration of selenium in a selenium-contaminated water or wastewater stream.

Ion exchange is based upon the phenomena of sorption and desorption. "Sorption" may be defined as the transfer of one or more solutes from a carrier fluid phase to a batch of rigid particles (a "sorbent"), while "desorption" is the reverse operation. Perry's Chemical Engineering Handbook (6th Ed.), p. 16–5. A given solute of interest can be separated from a carrier fluid by contacting the carrier fluid with a sorbent for which the solute of interest has great affinity. Under normal operation, when the sorbent has high affinity for the solute, the carrier fluid exits the column substantially free of the solute. When solute begins to "break through" (i.e., appear in the carrier fluid), the sorbent is typically regenerated.

In ion exchange particularly, the sorbent is a solid phase, typically a synthetic resin, which contains bound functional groups having either a positive or negative charge and displaceable ions (counterions) of opposite charge. The ion exchange resin may be viewed as a high capacity, strongly ionized, homogeneous electrolyte. Segupta et al., Characterization, Development and Use of New Breed of Anion-Exchange Resins For Selective Removal of Cr(VI) and Other Toxic Anions, Proceedings of the 42nd Purdue University Industrial Waste Conference (1987), p. 795. Under typical conditions of usage of ion exchange resins, at the completion of ion exchange, the resin is regenerated by contacting it with a solution containing the displaced ion.

The present invention makes novel use of a cation exchange resin to remove anionic selenium and arsenic from contaminated water or wastewater streams. The efficacy of the water purification process of the present invention derives from the reactivity of iron ions complexed to a cation exchange resin, preferably a strong acid cation exchange resin. It has been found that iron(III) ions at the exchange sites in a cation exchange resin have the capacity to form resin-immobilized complexes with selenite salts in a selenite contaminated water or wastewater stream in contact with the iron loaded resin. Similarly, the water purification process of the present invention directed to reducing arsenic concentration in arsenic contaminated water or wastewater streams derives from the capacity of iron(III) complexed cation exchange resins to form immobilized complexes with arsenate salts in a contaminated water or wastewater stream contacting the iron(III) complexed resin.

The commercial feasibility of the process of the present invention derives particularly from the high surface area of the iron-loaded cation exchange resins, and the capacity of such resins to be regenerated by a simple two-step regeneration procedure comprising (1) contacting the "spent" resin bearing the contaminant selenite or arsenate complexes with an acid regenerate solution to produce a low volume selenium or arsenic concentrated wastewater stream and the acid form of the resin, and thereafter (2) contacting the acid form of the resin with an aqueous solution of an iron salt.

The cation exchange resin used in accordance with the present invention is first complexed or loaded with iron ions by contacting the resin with a solution of iron salts. In the iron-complexed resin iron cations occupy the cation exchange sites on the cation exchange resin. The present invention takes advantage of the capacity of the resin-complexed iron ions to react with selenite and arsenate anions in a water or wastewater stream contacted with the iron-complexed resin to form the respective iron(III) selenite and iron(III) arsenate complexes immobilized on the resin surface, thereby reducing the concentration of the respective contaminant anions in the water or wastewater stream. The immobilized form of the iron-selenite and the iron arsenate are referred to herein as immobilized complexes of those salts to give cognizance to the fact that the cations from the water or wastewater stream will also be immobilized in the resin to maintain charge neutralization. Ferric [iron(III)] salts are used to load the cation exchange resin intended for use in accordance with the present invention to remove arsenate or selenite from contaminated water or wastewater streams.

One significant advantage of the novel use of cation exchange resins in accordance with the present invention is that the iron-loaded exchange resin can be easily regenerated by treatment with acid to produce a concentrated iron selenite or iron arsenate wastewater stream and the acid form of the cation exchange resin. The selenite/arsenate immobilizing iron-complexed resin can be prepared by treating the acid form of the resin with a solution of soluble ferric salts.

Preferably the cation exchange resin used in accordance with the present invention is a strong acid type cation exchange resin. Such resins are well known in the art. Preferred resins include Purolite's C-100 resin and IR-120 resins sold by Rohm & Haas. Generally resins used for water softening which allow for a wide range of pH variability, and which have a high capacity for iron binding are considered to be most useful for the water purification process of this invention.

With reference to FIG. 1, in accordance with this invention, a wastewater or drinking water stream 11 can be processed in accordance with this invention to reduce the concentration of selenium contaminants by contacting it with an iron(III)-complexed strong acid cation exchange resin (not shown) in ion exchange resin column 12 to produce a treated stream 14 having reduced selenium concentration. If the selenium contaminated water or wastewater stream 11 contains suspended particulates, it is preferred that the stream be first directed through a filtration unit 16 before contact with the iron complexed cation exchange resin in ion exchange column 12. Contaminated water or wastewater stream 11 can contain selenium in any one of its naturally occurring valence states. If a portion of the selenium contaminants are in the form of selenate anions, it is preferred that the selenate contaminants be reduced to selenite prior to contacting the contaminated water or wastewater stream 11 with the iron loaded resin. This is accomplished by adding a reducing agent 18 to the water or wastewater stream in an amount effective to accomplish reduction of the selenate species to selenite.

Accordingly, water or wastewater stream 11 is mixed with a reducing agent effective to reduce the selenate to selenite prior to delivery of the stream to the ion exchange column 12. The reducing agent can be added in a separate mixer 20 or a mix tank, or simply in a mixing zone of a conduit carrying the contaminated water or wastewater stream to the ion exchange column. The reducing agent 18 is preferably dissolved in water and metered into and mixed into the contaminated water or wastewater stream 11 at a rate calculated to provide at least a stoichiometric amount (based on selenate concentration in the stream) of the reducing agent; however, use of excess reducing agent can be employed without detriment to the process. The nature of the reducing agent is not critical, except that its reducing potential must be sufficient to reduce selenate to selenite in the contaminated water or wastewater stream. One preferred, cost effective reducing agent is sodium bisulfite.

The selenite-containing water or wastewater stream 11 is directed to ion exchange column 12 containing the iron-loaded cation exchange resin where selenite salts complex with the resin-complexed iron(III) on the exchange sites of the cation exchange resin, resulting in an effluent stream 14 having a reduced selenium concentration. The selenium concentration in the effluent stream 14 can be monitored to assess the selenite removal efficiency of the iron-loaded resin in the exchange column during treatment operations. When the selenite concentration rises above a pre-determined threshold value, the flow of water or wastewater stream 11 can be stopped, and the iron-loaded resin regenerated by contacting the resin first with an acid 22 to produce the acid form of the cation exchange resin and a low volume, selenium concentrated, wastewater stream 24. The iron-loaded resin is then regenerated by contacting the resulting acid form of the resin with a solution of soluble iron(III) salt 23.

The basis for selection of the particular acid and ferric salts for regeneration of the iron-loaded cation exchange resin is principally one of economics. One suitable low cost ferric salt is ferric chloride. Any of a wide variety of commercial mineral acids can be used, including particularly hydrochloric acid or sulfuric acid.

The maximum flow rate of the contaminated water or wastewater stream 11 through the water purification system illustrated in FIG. 1 depends on the nature of the waste stream itself, the size of the ion exchange column and the reactivity of the iron-loaded cation exchange resin in that column. Typically flow rates can range from about 2 gallons/minute/cubic foot of resin to about 15 gallons/minute/cubic foot of resin in the ion exchange column 12. Preferably the ion exchange column 12 is constructed to contain a bed of iron-loaded ion exchange resin having a depth of at least 24 inches. The present process can be carried out more efficiently in a treatment system utilizing 2 or more ion exchange columns 12 so that one resin column is being regenerated while one or more other columns are in use in the process.

Figure 2:
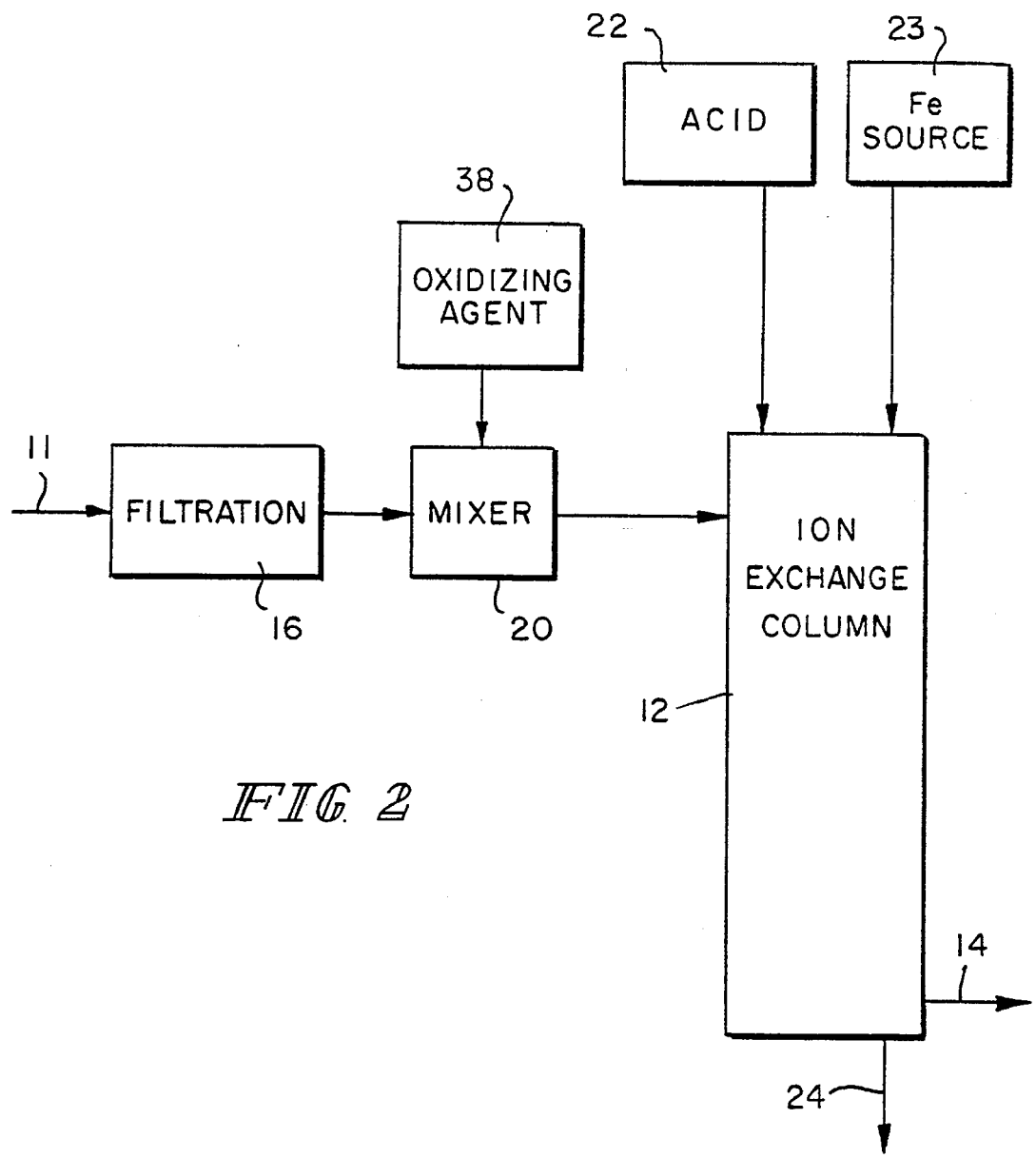
FIG. 2 is a flow sheet for a preferred embodiment of the process of the present invention for removal of arsenic in an arsenic-contaminated water or wastewater stream.

FIG. 2 illustrates a process flow sheet for reducing arsenic concentration in a water or wastewater stream 31 in accordance with this invention. The process relies for its efficacy on its capacity of an iron(III) complexed strong acid cation exchange resin in ion exchange column 32 to react with arsenate anions in the arsenic contaminated stream 31 to form a resin immobilized iron arsenate salt complex and an effluent stream 34 having a reduced arsenic concentration. If the contaminating arsenic is principally in the form of arsenate ions, the contaminated water or wastewater stream can be delivered directly to the ion exchange column 32 following optional treatment in a filtration unit 16. Typically arsenic contaminated water or wastewater streams 31 contain arsenic in multiple ionic forms, including arsenate. The arsenic removal efficiency of the treatment process in accordance with this invention can be optimized by treating the arsenic contaminated stream with an oxidizing agent 38 to oxidize non-arsenate forms of arsenic contaminants to arsenate prior to contacting the water stream with the iron(III)loaded cation exchange resin in ion exchange column 32. The nature of oxidizing agent 38 is not critical, except that it have the oxidizing potential required to effect oxidation of contaminant non-arsenate arsenic species to arsenate in the contaminated stream 31. The oxidizing agent 38 is metered into the contaminated water or wastewater stream 31 to provide at least a stoichiometric amount of oxidizing agent necessary to oxidize nonarsenate species to arsenate. Any of a wide variety of oxidizing agents can be used, including chlorine and other sources of chlorine-based oxidants, and hydrogen peroxide.

The effluent stream 34 having a reduced arsenic concentration from ion exchange column 32 can be monitored for arsenic contamination to assess the extant efficiency of the ion exchange column. The iron-loaded cation exchange resin in ion exchange column 32 is regenerated using the same procedure described above for the iron-loaded resins used for selenium removal.

It should be understood that a water or wastewater stream contaminated with both arsenic and selenium contaminants can be treated in accordance with this invention, for example, firstly by processing it to reduce the selenium concentration and directing the effluent 14 having reduced selenium concentration (FIG. 1) into the water purification process for reducing arsenic concentration as illustrated in FIG. 2 to produce an effluent stream having a reduced concentration of both selenium and arsenic.

The water purification processes of the present invention each derive from the efficacy of iron-loaded strong acid cation exchange resins to form immobilized complexes with selenite and arsenate salts, respectively, in contaminated water or wastewater streams. There is also provided in accordance with the present invention an apparatus for treatment of a water or wastewater stream to reduce the concentration of selenium contaminants in said stream. The apparatus comprises a strong acid cationic exchange resin complexed with iron(III) and a means for contacting the stream with said iron complexed cation exchange resin. Contact with the resin can be accomplished in a batch-type tank treatment wherein a batch of water or wastewater to be treated is agitated with iron-loaded resin or in a continuous flow mode in a resin column having a contaminated water or wastewater inlet and a processed stream outlet. In a preferred embodiment, paralleling the above-described water or wastewater purification process embodiments of this invention, the apparatus further comprises a means for adding a reducing agent to the stream prior to its contact with the iron(III)-complexed cation exchange resin. There is also provided in accordance with this invention an apparatus for treating a water or wastewater stream containing arsenic contaminants to reduce the arsenic concentration in the stream. The apparatus comprises a strong acid cation exchange resin complexed with iron(III) and means for contacting the stream with the iron(III)-complexed cation exchange resin. Preferably the apparatus includes a means for adding an oxidant to the water or wastewater stream prior to contacting the stream with the iron(III) complex cation exchange resin. The method and apparatus in accordance with the present invention enable reduction of selenium and arsenic levels to 10 parts per billion or lower.

The following Examples illustrate the practice of this invention:

EXAMPLE 1

An ion exchange column was prepared using a 2.5 cm×30 cm glass column equipped with a stopcock. A suspension of 62 g of strong cation exchange resin in 3M hydrochloric acid was charged into the column. This was washed with deionized water until neutral and then treated with a solution containing 15 g of anhydrous ferric chloride in 200 mL of water. The column was then washed with deionized water until the effluent was fee of iron. A 4.0 liter sample of deionized water which was spiked with sodium selenite at 100 mg/L was then run through the column. The effluent contained less than 0.5 mg/L of selenium.

EXAMPLE 2

Following the procedure of Example 1, a refinery waste containing 100 micrograms of selenium per liter was treated with sodium bisulfite at 100 milligrams per liter and then run through the ion exchange column. The effluent contained 25 micrograms of selenium per liter (25 ppb).

EXAMPLE 3

Following the procedure of Example 1, a second refinery waste containing 100 ppb of selenium was treated with sodium bisulfite and run through the ion exchange column. The effluent contained less than 5 ppb of selenium.

EXAMPLE 4

Following the procedure of Example 1, a laboratory prepared spike of sodium arsenate at 100 ppm was run through the ion exchange column. The effluent contained less than 0.5 ppm of arsenic.

EXAMPLE 5

Following the procedure of Example 1, a well water sample containing 65 ppb of arsenic was treated with 0.5 milliliters of 5% sodium hypochlorite per liter of water and run though the ion exchange column. The effluent contained less than 5 ppb of arsenic.

Although the invention has been described in detail with reference to certain preferred embodiments, variations and modifications exist within the scope and spirit of the invention as described and defined in the following claims.

We claim:

1. A method for reducing arsenic concentration in a wastewater or drinking water stream contaminated with arsenic-containing contaminants comprising arsenate, said process comprising the step of contacting the contaminated water stream with an iron(III)-complexed cation exchange resin to form an acid exchangeable iron(III) arsenate complex immobilized on said cation exchange resin and an effluent stream having reduced arsenic concentration.

2. The process of claim 1 further comprising the step of adding an oxidant to the water or wastewater stream to convert at least a portion of non-arsenate arsenic-containing contaminants to arsenate prior to contacting the stream with the iron(III)-complexed cation exchange resin.

3. In a method of removing arsenic contaminants from a wastewater or drinking water stream by forming iron(III) arsenate and separating same from the stream, the improvement comprising the steps of complexing a strong acid cation exchange resin with iron(III) and contacting the iron(III)-complexed cation exchange resin with the contaminated stream to form an acid exchangeable iron(III) arsenate complex immobilized on the cation exchange resin and an effluent stream of reduced arsenic concentration.

4. The method of claim 3 further comprising the step of adding an oxidant to the water or wastewater stream to convert at least a major portion of non-arsenate arsenic-containing contaminants in the stream to arsenate prior to contacting the stream with the iron(III) complexed cation exchange resin.

* * * * *